United States Patent [19]

Schüpphaus et al.

[11] Patent Number: 5,069,328
[45] Date of Patent: Dec. 3, 1991

[54] DOUBLE CENTRAL CHAIN BELT ASSEMBLY

[75] Inventors: Dieter Schüpphaus, Castrop-Rauxel; Hans D. Nowak, Herne, both of Fed. Rep. of Germany

[73] Assignee: Klöckner-Becorit GmbH, Castrop-Rauxel, Fed. Rep. of Germany

[21] Appl. No.: 535,120

[22] Filed: Jun. 8, 1990

[30] Foreign Application Priority Data

Jun. 10, 1989 [DE] Fed. Rep. of Germany ....... 3918992

[51] Int. Cl.$^5$ .............................................. B65G 19/24
[52] U.S. Cl. ..................................... 198/731; 198/732
[58] Field of Search ................................. 198/731, 732

[56] References Cited

U.S. PATENT DOCUMENTS 3,587,831  6/1971  Temme ................................. 198/732
3,653,492  4/1972  Temme ................................. 198/731

FOREIGN PATENT DOCUMENTS 0838124  3/1952  Fed. Rep. of Germany .
1291709  11/1969  Fed. Rep. of Germany .
2013089  10/1971  Fed. Rep. of Germany .
2755880  8/1987  Fed. Rep. of Germany .

Primary Examiner—Joseph E. Valenza
Assistant Examiner—Tuan N. Nguyen
Attorney, Agent, or Firm—Horst M. Kasper

[57] ABSTRACT

A double central chain belt assembly for a chain scraper conveyor has scraper members arranged at spacings relative to each other. Each scraper member comprises a central portion and two outside portions of the same configuration. Each adjacent pair of scraper members are connected together by a pair of chain portions which are arranged at respective sides of the center line of the assembly. Each end of each chain portion terminates in an end link which serves as a connecting link. The central portion and the outside portions of each scraper member are releasably connected together. Each central portion has engagement surfaces disposed in opposite relationship in the longitudinal direction of the assembly for the engagement of the teeth of a pin gear. On its outside at both sides, each central portion has flanks with oppositely disposed openings for receiving the end links of the chain portions therein. Each flank is arranged to receive, and to be secured, an outside portion.

18 Claims, 6 Drawing Sheets

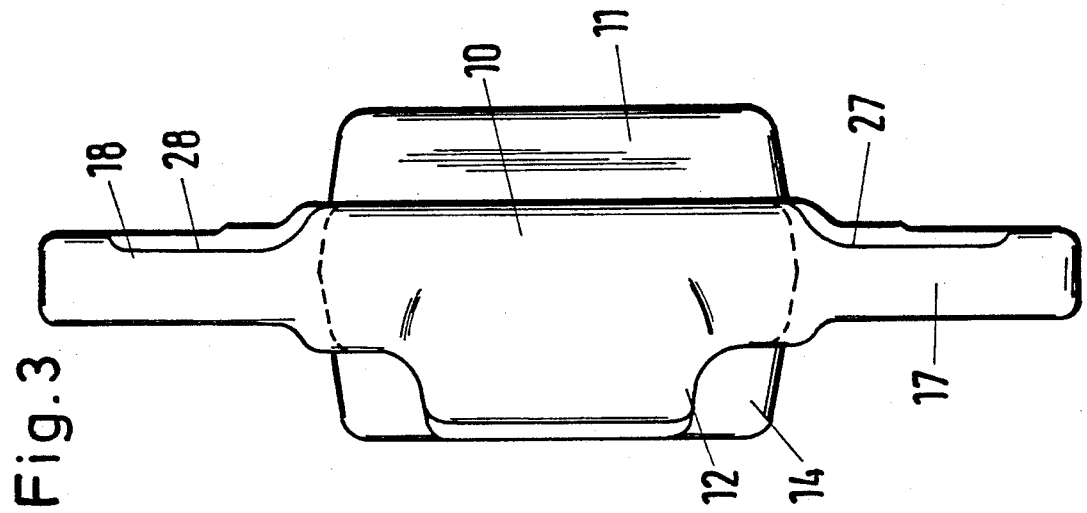
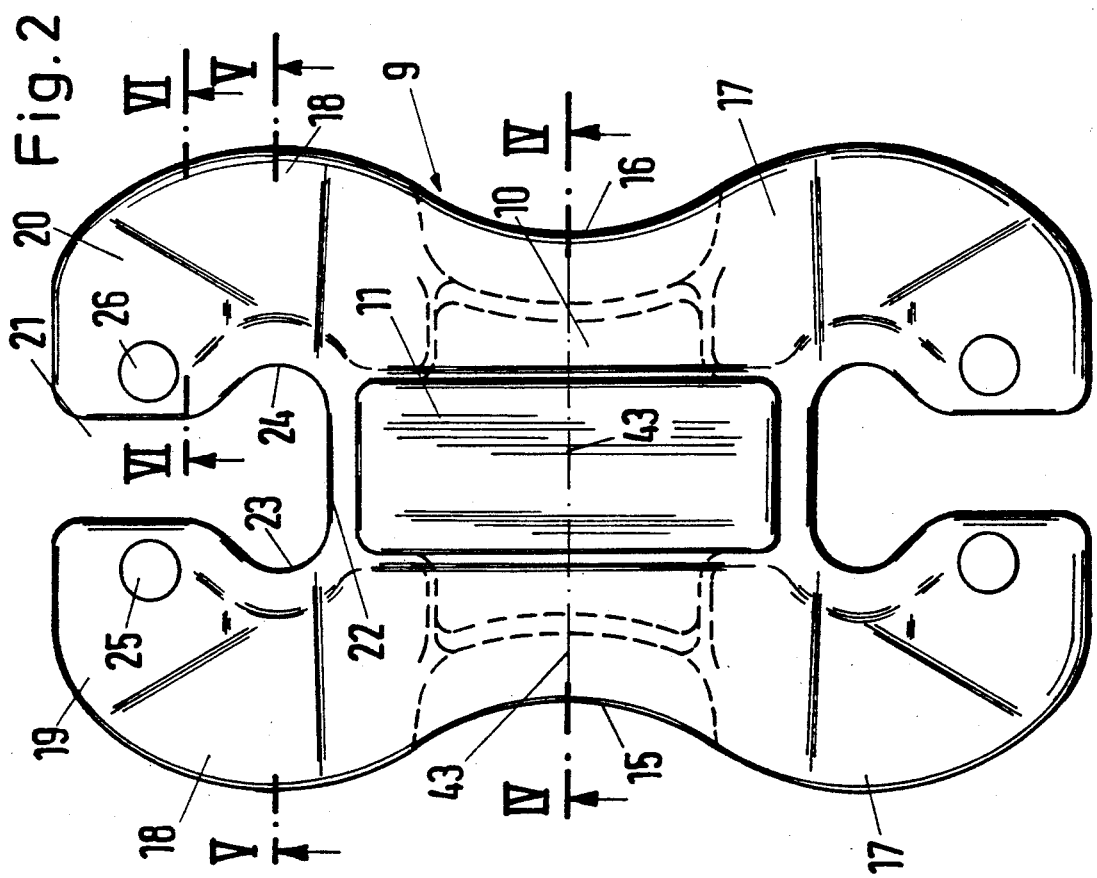

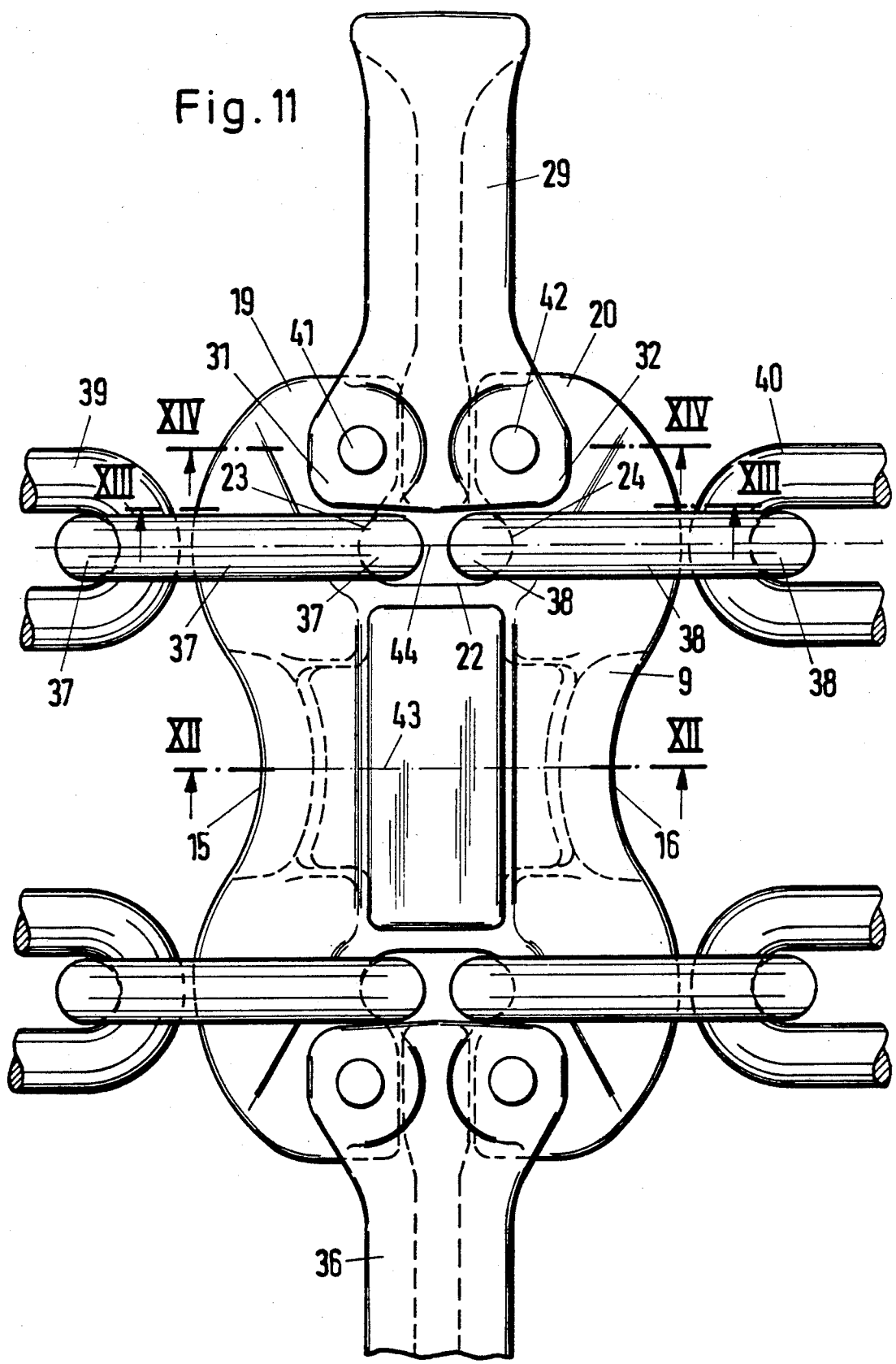

DOUBLE CENTRAL CHAIN BELT ASSEMBLY

BACKGROUND OF THE INVENTION

This invention relates to a double central chain belt assembly for a chain scraper conveyor, said assembly comprising scraper members arranged at spacings from each other and each comprising a central portion and two outside portions of the same configuration as each other, and chain portions connecting the scraper members together, each adjacent pair of scraper members being connected together by a pair of chain portions which are arranged at respective sides of the centre of the assembly, each end of each chain portion terminating in an end link which serves as a connecting link.

German patent specification No. 1 291 709 discloses a double central chain belt assembly for a chain scraper conveyor of the type set out above. In that arrangement the central portion is in the form of a chain lock member which has legs at both sides. The chain lock member has two openings which are disposed at a small spacing from each other and those openings, as considered in the longitudinal direction of the chain, are of a length corresponding to the internal length of a chain link lying in a flat condition. A scraper flight is fitted on to the leg of the chain lock member at each side and fixed in position thereon by means of a screw. That chain belt is driven by means of a suitable chain drum having teeth which engage the chain links which are lying flat, with the result that the chain links which are in an on-edge position are subjected to a correspondingly high wear-inducing loading by the teeth of the drive drum.

German patent specification No. 2 755 880 describes a double central chain belt assembly for a chain scraper conveyor which involves a curved region in the trough of the conveyor. In that arrangement the double central chain belt comprises belt elements which are connected together by means of joints which permit suitable compensating movements, with two chain lines defined by the belt elements being in juxtaposed relationship. Arranged at the one end of the respective belt elements are scraper members which are supported against the side wall of the conveyor trough in the curved region thereof. Furthermore, provided at the other ends of the belt elements are connecting bridge members. The one ends of the belt elements are secured to the side, which faces towards same, of the scrapers members, by way of pivotal connecting means. Force is applied to the double central chain belt to produce the driving movement thereof, only at the connecting bridge members. It will be seen therefore that as that double central chain belt is capable of negotiating a curve, it is generally too expensive for a chain scraper conveyor without curves.

Another form of double central chain belt assembly for a scraper conveyor, as disclosed in German patent specification No. 838 124, involves a double chain belt having two chain lines comprising a plate-type chain. The chain comprises a plurality of elements of given length, which are connected together by way of movement-compensating joints. In that arrangement, at one side each element has a limb with an eye portion while at the other side it has a fork portion, the eye portion and the fork portion being pivotally connected together by way of a connecting pin. At the one ends of the elements, entrainment arms are secured by screws to the respective outermost plate chain links at both sides of the chain. The chain belt is also capable of negotiating a curve and therefore has features which are unnecessary for a chain scraper conveyor without curves.

In still another form of double chain belt assembly for a scraper conveyor, as disclosed in German laid-open application (DE-OS) No. 2 013 089, scraper members are secured at given spacings to two oppositely disposed chain links of the two chain lines. A compensating joint is disposed between the two chain lines between each two adjacent scraper members. That permits automatic compensation in respect of length and force in the two chain lines. That chain belt is required to be driven by chain drums which engage directly into the chain and cause a high rate of wear in respect of the chain and the chain drums.

SUMMARY OF THE INVENTION

It is an object of this invention to provide a double chain belt assembly for a chain scraper conveyor which is capable of negotiating a drive pin-type gear and the rigid length of which is as short as possible between the outside portions of each scraper member.

According to this invention, there is provided a double central chain belt assembly for a chain scraper conveyor, said assembly comprising scraper members arranged at spacings from each other and each comprising a central portion and two outside portions of the same configuration as each other, and chain portions connecting the scraper members together, each adjacent pair of scraper members being connected together by a pair of chain portions which are arranged at respective sides of the central line of the assembly, each end of each chain portion terminating in an end link which serves as a connecting link, wherein each central portion is releasably connected to its associated outside portions, each central portion has engagement surfaces disposed in opposite relationship to each other in the longitudinal direction of the assembly for engaging the teeth of a pin gear, each central portion has a flank on each side, said flanks having oppositely disposed openings for engaging the end links of the associated chain portions, and each flank is arranged to receive, and to be secured to, an associated outside portion.

That configuration thus provides a double central chain assembly for a scraper conveyor, which is to be driven by means of a pin gear and the chains of which are thus treated in a substantially careful fashion. Because the drive to the chains is by means of a pin gear, proper functioning of the chain belt assembly is still ensured even without outside portions fitted on the central portions of the scraper flights. Furthermore functioning of the chain belt assembly is maintained, even in the event of a chain breakage at one side, by way of the pin gear, by virtue of the elimination of restoring moments. Another advantage is that the chain belt assembly can be inserted above ground in the upper and lower runs of a preassembled conveyor trough so that the assembly time of the conveyor at an underground location of use can be considerably reduced.

On the side directed towards the associated central portion each outside portion may have a fork for receiving the respective flank of the central portion. In that way, the two chains which form the double central chain of the assembly and which are connected to the central portions are appropriately secured in position.

Advantageously, in each central portion the bottom of the opening in each flank is provided with a pair of connecting troughs for receiving the end links of the associated chain portions. The configuration of the troughs corresponds to the internal contour of the chain end links. In that case, pressure in relation to surface area can be kept at a low level.

Conveniently, in each central portion each flank has first and second limbs which delimit the respective opening, screw bores being formed in mutually opposite relationship in the limbs. The chain end links may then be positively fitted onto the limbs of the flanks of the central portion. The breaking strength of the limbs is desireably at least 20% above the chain breaking load.

Desireably, the spacing of the connecting troughs in the bottom of each opening corresponds to double the thickness of the wire of the chain portions plus a necessary installation and movement clearance.

Desireably, the width of the insertion orifice of the opening of each flank corresponds to the single thickness of the wire of the chain portions plus a necessary movement and insertion clearance.

Conveniently, in each scraper member the outside portions are positively fitted onto the flanks of the central portion with the forks of the outside portions being engaged over the flanks of the central portion.

In each scraper member, each outside portion may be provided with two screw bores on its side towards the central portion, the screw bores in each outside portion being aligned with the screw bores in the associated flank of the central portion, and each outside portion being connected to the associated flank of the central portion by two screws fitted in the screw bores.

BRIEF DESCRIPTION OF THE DRAWINGS

FIG. 2 shows a plan view of the central portion of a scraper member of the assembly of FIG. 1;

FIG. 3 shows a side view of the FIG. 2 scraper member;

FIG. 11 is a plan view of the double central chain belt assembly in the region of a scraper member, in the assembled condition thereof;

DESCRIPTION OF THE PREFERRED EMBODIMENT

Figure 1:
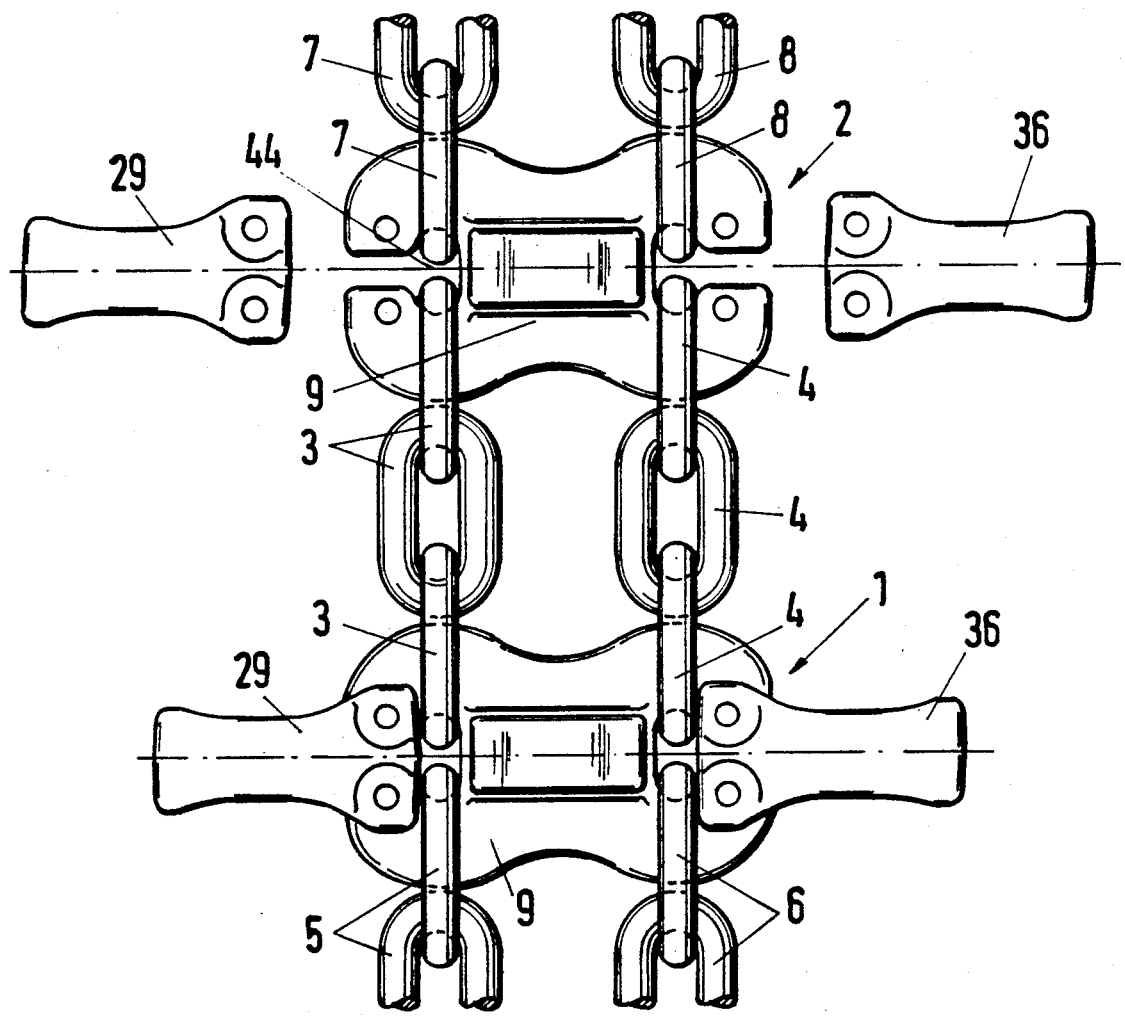
FIG. 1 is a plan view of a part of a double central chain belt assembly embodying this invention.
Figure 4:
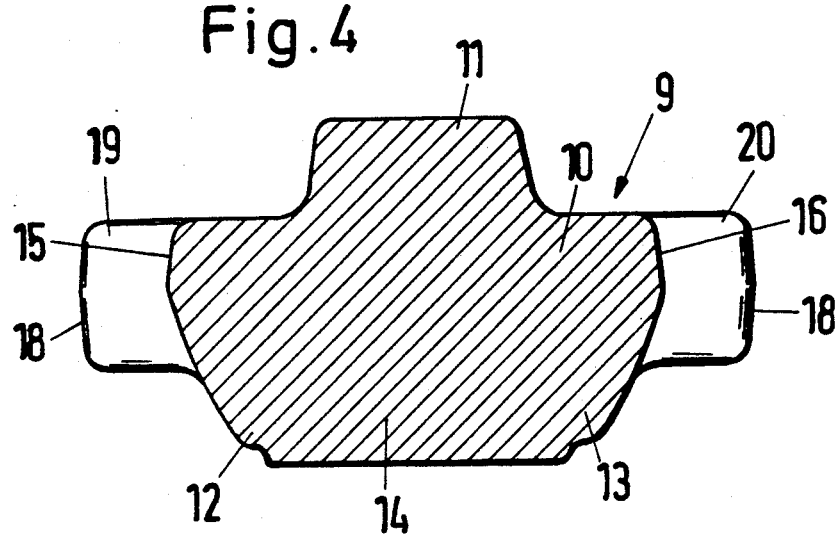
FIG. 4 is a view in section taken along line IV—IV in FIG. 2.
Figure 5:
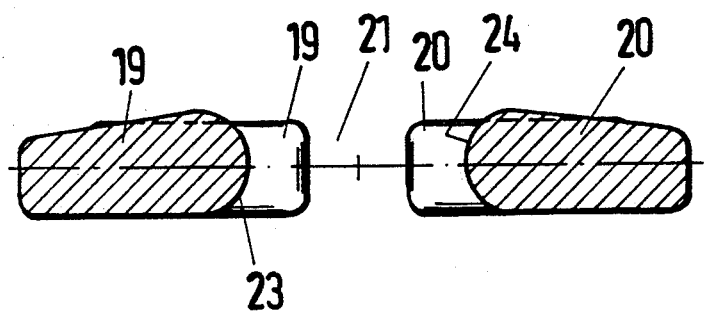
FIG. 5 is a view in section taken along line V—V in FIG. 2.
Figure 6:
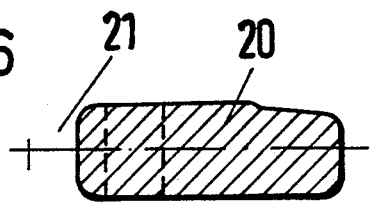
FIG. 6 is a view in section taken along line VI—VI in FIG. 2.
Figure 10:
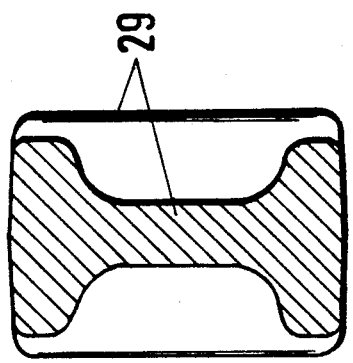
FIG. 10 is a view in section taken along line X—X in FIG. 8.
Figure 9:
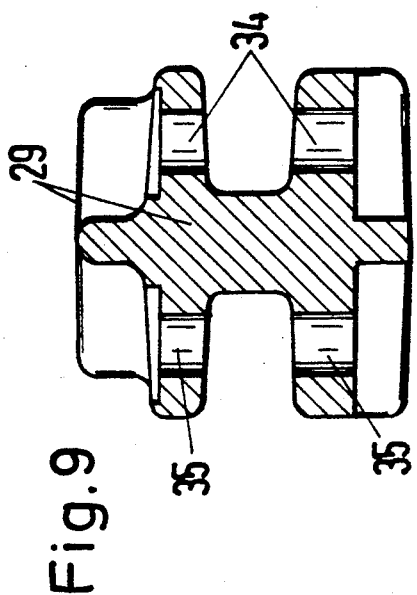
FIG. 9 is a view in section taken along line IX—IX in FIG. 8.
Figure 7:
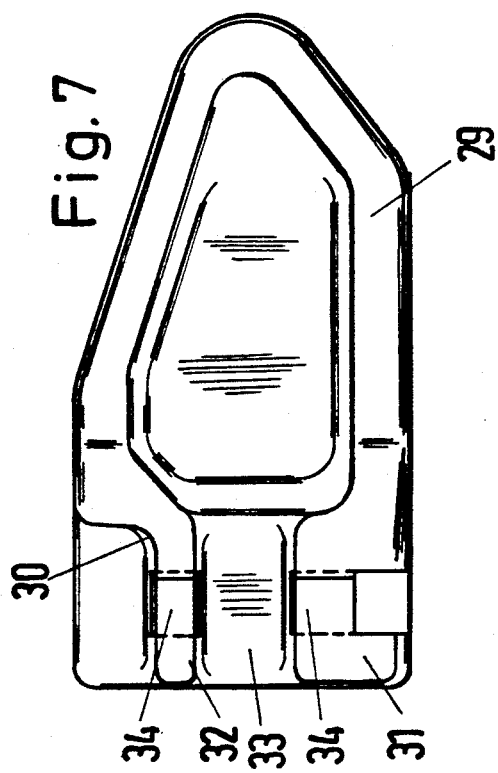
FIG. 7 is a side view of an outside portion of the FIG. 2 scraper member.
Figure 8:
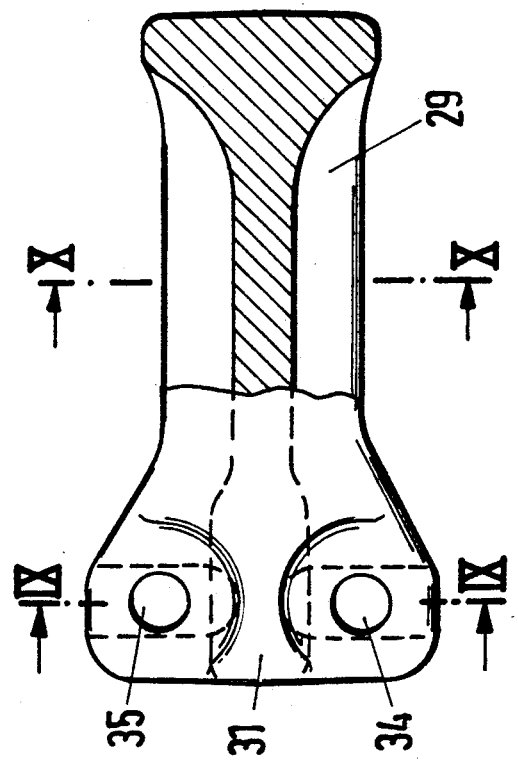
FIG. 8 is a side view in partial section of FIG. 7.
Figure 12:
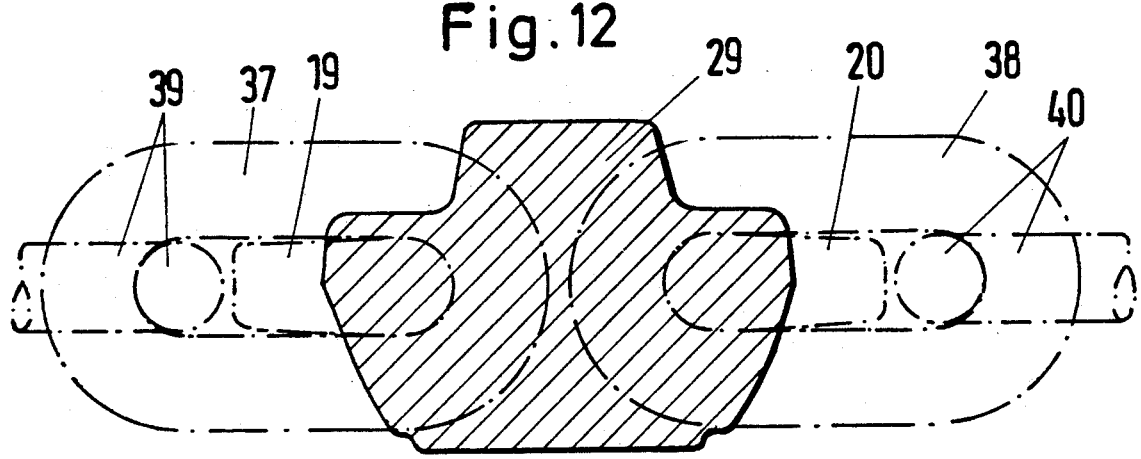
FIG. 12 is a view in section taken along line XII—XII in FIG. 11.
Figure 13:
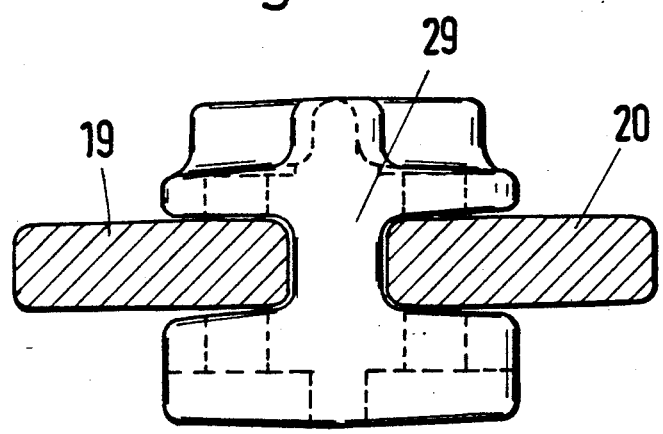
FIG. 13 is a view in section taken along line XIII—XIII in FIG. 11.
Figure 14:
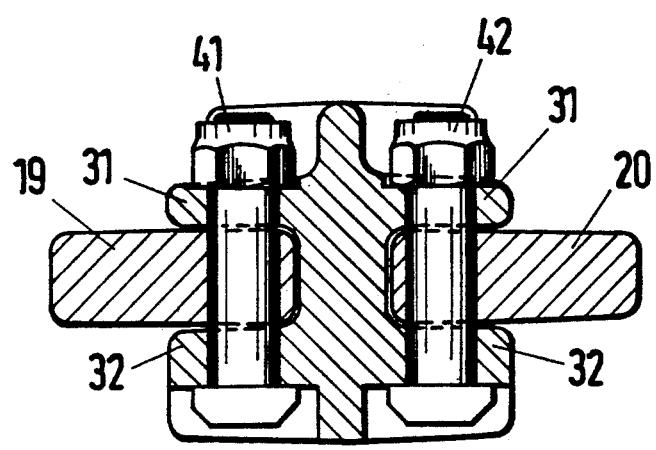
FIG. 14 is a view in section taken along line XIV—XIV in FIG. 11.

Referring firstly to FIG. 1, shown therein is a region of a double central chain belt assembly of a chain scraper conveyor, comprising two adjacent scraper members 1 and 2, with an arrangement comprising two chain portions 3 and 4 between the scraper members 1 and 2 at the mutually facing sides thereof, and chain portions 5, 6 and 7, 8 respectively provided on each of the other sides of the respective scraper members 1 and 2. The scraper member 1 is shown in the assembled condition while the scraper member 2 is shown in an exploded view.

Referring now to FIGS. 2 through 6, shown therein is a central portion 9 of a scraper member 1 or 2. The portion 9 has a waisted central part 10 with an upwardly projecting bar portion indicated at 11 of FIG. 3. Provided at the underside between the oppositely disposed ends shown at 12 and 13 in FIG. 4 of the central portion 9 is a broad bar portion shown at 14 in FIG. 3 and FIG. 4. Provided in the central part of the central portion 9 are engagement surfaces 15 and 16 for the teeth of a stub-tooth or pin gear (not shown in the drawing) for driving the chain assembly.

At both sides of the central part 10, and looking more particularly at the upper half of FIG. 2, the central portion 9 terminates in flank portions as indicated at 17 and 18 in FIG. 2. The flank portion 18 has two limbs 19 and 20 between which is formed an opening 21. Provided in the bottom 22 of the opening 21 are engagement troughs 23 and 24, the spacing of which is such that it corresponds to double the thickness of the wire or bar material of the chain portions 3, 4 plus a necessary installation and movement clearance as indicated at 44 in FIG. 11. Provided further outwardly in the opening 21 are two oppositely disposed open bores indicated at 25 and 26 in FIG. 1.

Troughs 27 and 28, shown in FIG. 3, are provided in the flank portions 17 and 18 for positively accommodating connecting chain links 37 and 38 (see FIG. 11) of the chain portions 3 and 4.

The central portion 9 is of a symmetrical configuration relative to the centre line 43 in FIGS. 2 and 11, so that the foregoing description relating to the upper half in FIG. 2 also applies in regard to the lower half of FIG. 2.

Looking now at FIGS. 7 through 10, the outside portion 29 has at its end 30 which is towards the central portion 9 an opening 33 which is formed by two flanges 31 and 32. Extending through the flanges 31 and 32 are two bores 34 and 35. In the assembled condition, the bores 34 and 35 are aligned with the bores 25 and 26 of the central portion 9. The bores 25 and 26 are open at one side. The outside portion 29 is fixedly but releasably connected to the central portion 9 by two suitale screws which are passed through the bores 16, 26, 34, 35.

FIGS. 11 through 14 show a scraper member in the assembled condition, comprising the central portion 9 and the two outside portions 29 and 36. Looking more particularly at the upper half in FIG. 11, connecting chain links 37 and 38 are provided at the bottom 22 of the opening 21. Further chain links 39 are provided on the connecting chain link 37 and likewise further chain links 40 are provided on the connecting chain link 38.

The outside portion 29 fitted to the central portion 9 by engaging the flanges 31 and 32 with the limbs 18 and 20 of the central portion 9 and then securing the outside portion in place with screws 41, 42.

The same description as set forth above in relation to the upper half of FIG. 11 also applies in regard to the lower half of FIG. 11, which is symmetrical with respect to the centre line 43.

It will be appreciated that the above-described construction has been set forth by way of example and illustration of the present invention and that modifications and alterations may be made therein without thereby departing from the spirit and scope of the invention.

We claim:

1. A double central chain belt assembly for a chain scraper conveyor, said assembly comprising scraper members arranged at spacings from each other and each comprising a central portion and two outside portions of the same configuration as each other, and chain portions connecting the scraper members together, each adjacent pair of scraper members being connected together by a pair of chain portions which are arranged at respective sides of the central line of the assembly, each end of each chain portion terminating in an end link which serves as a connecting link, wherein each central portion is releasably connected to its associated outside portions, each central portion has engagement surfaces disposed in opposite relationship to each other in the longitudinal direction of the assembly for engaging the teeth of a pin gear, each central portion has a flank on each side, said flanks are extended horizontal planar portions having recesses for connecting chain links and vertical bores for connecting means which connect a lateral pusher element having oppositely disposed openings for engaging the end links of the associated chain portions, and each flank is arranged to receive, and to be secured to, an associated outside portion.

2. An assembly as claimed in claim 1, wherein on the side directed towards the associated central portion each outside portion has a fork for receiving the respective flank of the central portion.

3. An assembly as claimed in claim 1, wherein in each central portion the bottom of the opening in each flank is provided with a pair of connecting troughs for receiving the end links of the associated chain portions.

4. An assembly as claimed in claim 1, wherein in each central portion each flank has first and second limbs which delimit the respective opening, screw bores being formed in mutually opposite relationship in the limbs.

5. An assembly as claimed in claim 3, wherein the spacing of the connecting troughs in the bottom of each opening corresponds to double the thickness of the wire of the chain portions plus a necessary installation and movement clearance.

6. An assembly as claimed in claim 1, wherein the width of the insertion orifice of the opening of each flank corresponds to the single thickness of the wire of the chain portions plus a necessary movement and insertion clearance.

7. An assembly as claimed in claim 2, wherein in each scraper member the outside portions are positively fitted onto the flanks of the central portion with the forks of the outside portions being engaged over the flanks of the central portion.

8. An assembly as claimed in claim 4, wherein in each scraper member each outside portion is provided with two screw bores on its side towards the central portion, the screw bores in each outside portion being aligned with the screw bores in the associated flank of the central portion, and each outside portion being connected to the associated flank of the central portion by two screws fitted in the screw bores.

9. A double central chain belt assembly for a chain scraper conveyor, said assembly comprising scraper members arranged at spacings from each other and comprising in each case a central portion and two outside portions of the same configuration, wherein the central portions of, in each case, two neighboring scraper members are connected to vertical chain end members serving as connection chain members, wherein the two chain portions are disposed on both sides of the center line of the central chain belt by means of, in each case, two chain portions, wherein the chain end members are provided at the two ends of the chain portions, and wherein the chain end members serve as connection chain members, wherein the central portions exhibit on two sides outside flanks with oppositely disposed recesses for engaging the connection chain members of the chain portion and for an insertion and an attachment of the outside portions, wherein connecting troughs for the connection chain members are disposed at the floor of the recesses of the flanks of the center portion, wherein the width of the insertion openings of the recesses corresponds to the single wire thickness of the chain plus a necessary movement and installation clearance, wherein the center portion exhibits engagement surfaces, disposed parallel to each other in chain belt longitudinal direction, for teeth of a drive wheel, wherein the engagement surfaces (15, 16) are formed for the engagement of the teeth of a pin gear, and wherein the distance of the connecting troughs (23, 24) in the bottom (22) of the recesses (21) corresponds to the double wire strength of the chain (3, 4) plus a necessary installation and movement clearance, and wherein the engagement surfaces (15, 16) for the teeth of the pin gear are only disposed in the center region of the central portion (9);

wherein two screw bores are provided at the outer portion (29, 30) on its side toward the central portion and disposed perpendicular to the plane of the central portion (9) for attachment of the scrape members.

10. The double central chain belt assembly according to claim 9, wherein the outer portions (29, 36) exhibit on a side disposed toward the central portion a fork (31, 32, 33) for an insertion onto the flanks (17, 18) of the central portion (9).

11. The double central chain belt assembly according to claim 10, wherein the flanks (17, 18) exhibit in each case two limbs (19, 20) delimiting the recesses (21), and wherein screw bores (25, 26) are formed at the limbs (19, 20), which screw bores (25, 26) are disposed opposite to each other.

12. The double central chain belt assembly according to claim 10, wherein the outer portions (29, 36) are frictionally inserted on the flanks (17, 18) of the central portion (9), and wherein the outer portions (29, 36) project with the forks (31, 32, 33) over the flanks (17, 18) of the central portion (9).

13. The double central chain belt assembly according to claim 9, wherein two screw bores (34, 35) are provided at the outer portion (29, 36) on its side toward the central portion, wherein the two screw bores (34, 35) are flush with the screw bores (25, 26) of the central portion (9), and wherein the two screw bores (34, 35) are connected to each other with two fitting screws (41, 42).

14. A double central chain belt assembly for a chain scraper conveyor, said assembly comprising
a first scraper member comprising
a first central portion, wherein the first central portion exhibits on two sides outside flanks with oppositely disposed recesses, wherein the recesses have insertion openings and bottoms;

a first outside portion to be engaging the connection chain members of the chain portion and for inserting and attaching the first outside portion into one of the said recesses;

a second outside portion having the same configuration as the first outside portion and for inserting and attaching the second outside portion into one of the said recesses;

a first vertical chain end member serving as a connection chain member;

a second vertical chain end member serving as a connection chain member;

a second scraper member disposed neighboring to and at a spacing from the first spacing member and comprising a second central portion, wherein the second central portion exhibits on two sides outside flanks with oppositely disposed recesses and wherein the recesses have insertion openings and bottoms;

a third outside portion for inserting and attaching the third outside portion into one of the said recesses;

a fourth outside portion having the same configuration as the third outside portion for inserting and attaching the fourth outside portion into one of the said recesses and wherein the first central portion of the first scraper member and the second central portion of the second scraper member are connected to said vertical chain end members;

a central chain belt wherein the first vertical chain end member and the second vertical chain end member are disposed on two opposed sides relative to a center line of the central chain belt by means of in each case two chain portions, wherein the first vertical chain end member and the second vertical chain end member are provided at a respective one of two ends of the chain portions and wherein the connection chain members of the chain portions are to be engaged by one of said recesses and wherein connecting troughs for the connection chain members are disposed at the floor of the recesses of the flanks of the center portion, wherein the center portion exhibits engagement surfaces, disposed parallel to each other in chain belt longitudinal direction, for teeth of a drive wheel, wherein the width of the insertion openings of the recesses corresponds to the single wire thickness of the chain plus a necessary movement and installation clearance and wherein the distance of the connecting troughs (23, 24) in the bottom (22) of the recesses (21) corresponds to the double wire strength of the chain (3, 4) plus a necessary installation and movement clearance;

a pin gear having teeth;

engagement surfaces (15, 16) formed for the engagement of the teeth of the pin gear, wherein the engagement surfaces (15, 16) for the teeth of the pin gear are only disposed in the center region of the central portion (9).

15. The double central chain belt assembly according to claim 14, wherein the outer portions (29, 36) exhibit on a side disposed toward the central portion a fork (31, 32, 33) for an insertion onto the flanks (17, 18) of the central portion (9).

16. The double central chain belt assembly according to claim 14, wherein
the flanks (17, 18) exhibit in each case two limbs (19, 20) delimiting the recesses (21), and wherein screw bores (25, 26) are formed at the limbs (19, 20), which screw bores (25, 26) are disposed opposite to each other.

17. The double central chain belt assembly according to claim 14, wherein the outer portions (29, 36) are frictionally inserted on the flanks (17, 18) of the central portion (9), and wherein the outer portions (29, 36) project with the forks (31, 32, 33) over the flanks (17, 18) of the central portion (9).

18. The double central chain belt assembly according to claim 14, wherein two screw bores (34, 35) are provided at the outer portion (29, 36) on its side toward the central portion, wherein the two screw bores (34, 35) are flush with the screw bores (25, 26) of the central portion (9), and wherein the two screw bores (34, 35) are connected to each other with two fitting screws (41, 42).

* * * * *